(12) United States Patent
Akbulut et al.

(10) Patent No.: US 9,959,193 B2
(45) Date of Patent: *May 1, 2018

(54) INCREASING ACCURACY OF TRACEABILITY LINKS AND STRUCTURED DATA

(71) Applicant: International Business Machines Corporation, Armonk, NY (US)

(72) Inventors: Muhtar B. Akbulut, Waban, MA (US); Mario A. Maldari, Longmont, CO (US); David D. Taieb, Charlestown, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/865,022

(22) Filed: Sep. 25, 2015

(65) Prior Publication Data

US 2016/0283225 A1   Sep. 29, 2016

Related U.S. Application Data

(63) Continuation of application No. 14/669,050, filed on Mar. 26, 2015.

(51) Int. Cl.
*G06F 9/44* (2006.01)
*G06F 11/36* (2006.01)
(Continued)

(52) U.S. Cl.
CPC .......... *G06F 11/3636* (2013.01); *G06F 8/71* (2013.01); *G06F 8/73* (2013.01); *G06F 8/75* (2013.01);
(Continued)

(58) Field of Classification Search
CPC ..... G06F 8/71; G06F 8/73; G06F 8/75; G06F 11/3636; G06F 17/2785; G06F 17/30371; G06N 7/005; G06N 99/005
See application file for complete search history.

(56) References Cited

U.S. PATENT DOCUMENTS 7,849,049 B2 * 12/2010 Langseth .......... G06F 17/30563
707/602
7,917,897 B2   3/2011 Bassin et al.
(Continued)

OTHER PUBLICATIONS

Andrian Marcus et al., "When and How to Visualize Traceability Links?", [Online], ACM-2005, pp. 56-61, [Retrieved from Internet on Jun. 19, 2017], <http://delivery.acm.org/10.1145/1110000/1107669/p56-marcus.pdf>.*
(Continued)

*Primary Examiner* — Ziaul A Chowdhury
(74) *Attorney, Agent, or Firm* — Noah A. Sharkan

(57) ABSTRACT

According to an embodiment of the present invention, an artifact is received, and unstructured content of the artifact is parsed and analyzed to identify data for one or more of missing structured content of the artifact and inaccurate structured content of the artifact. The identified data is then added to the artifact. Embodiments of the present invention can be used, for example, to provide data for missing and inaccurate structured content in artifacts of Application Lifecycle Management (ALM) frameworks, and improve accuracy of structured information that used to run queries and create reports.

7 Claims, 7 Drawing Sheets

(51) Int. Cl.
*G06F 17/30* (2006.01)
*G06N 99/00* (2010.01)
*G06N 7/00* (2006.01)
*G06F 17/27* (2006.01)

(52) U.S. Cl.
CPC .... *G06F 17/2785* (2013.01); *G06F 17/30371* (2013.01); *G06N 7/005* (2013.01); *G06N 99/005* (2013.01)

(56) References Cited

U.S. PATENT DOCUMENTS

| | | | |
|---|---|---|---|
| 7,970,746 B2 | 6/2011 | Seshadri et al. | |
| 8,225,308 B2 | 7/2012 | Sedukhin et al. | |
| 8,789,015 B2 | 7/2014 | Lerum et al. | |
| 8,935,654 B2 | 1/2015 | Sengupta et al. | |
| 9,244,813 B2 * | 1/2016 | Granshaw | G06F 11/3636 |
| 9,317,810 B2 * | 4/2016 | Rigdon | G06N 7/005 |
| 9,417,854 B1 * | 8/2016 | Agrawal | G06F 8/35 |
| 9,418,337 B1 * | 8/2016 | Elser | G06N 7/005 |
| 9,582,270 B2 * | 2/2017 | Chen | G06F 8/75 |
| 2006/0053096 A1 * | 3/2006 | Subramanian | G06F 17/30398 |
| 2006/0200461 A1 * | 9/2006 | Lucas | G06F 17/277 |
| 2006/0288268 A1 * | 12/2006 | Srinivasan | G06F 17/245 715/210 |
| 2007/0078872 A1 * | 4/2007 | Cohen | G06F 17/30696 |
| 2007/0130561 A1 | 6/2007 | Siddarampappa et al. | |
| 2007/0156848 A1 * | 7/2007 | Becker | G06F 17/30386 709/219 |
| 2008/0040704 A1 * | 2/2008 | Khodabandehloo | G06F 8/73 717/105 |
| 2008/0154651 A1 * | 6/2008 | Kenefick | G06Q 40/08 705/4 |
| 2008/0162491 A1 * | 7/2008 | Becker | G06F 17/30581 |
| 2008/0162509 A1 * | 7/2008 | Becker | G06F 17/30377 |
| 2011/0099541 A1 * | 4/2011 | Blomstedt | G06F 8/433 717/136 |
| 2011/0289026 A1 * | 11/2011 | Kannan | G06Q 30/00 706/12 |
| 2012/0185827 A1 * | 7/2012 | Eska | G06F 8/71 717/121 |
| 2013/0085971 A1 * | 4/2013 | Berenbach | G06F 11/3636 706/12 |
| 2013/0086556 A1 * | 4/2013 | Grechanik | G06F 11/3684 717/126 |
| 2014/0040312 A1 * | 2/2014 | Gorman | G06F 17/2785 707/771 |
| 2014/0082002 A1 * | 3/2014 | Kim | G06F 17/30047 707/755 |
| 2014/0130035 A1 | 5/2014 | Desai et al. | |
| 2014/0330799 A1 * | 11/2014 | White | G06F 17/30371 707/694 |
| 2015/0286951 A1 * | 10/2015 | Rigdon | G06N 5/04 706/52 |
| 2015/0378687 A1 * | 12/2015 | Malnati | G06F 8/70 717/110 |
| 2016/0239401 A1 * | 8/2016 | Li | G06F 11/3684 |
| 2017/0061324 A1 * | 3/2017 | Glass | G06N 99/005 |

OTHER PUBLICATIONS

Mark Grechanik et al., "Recovering And Using Use-Case-Diagram-To-Source-Code Traceability Links", [Online], ACM-2007, pp. 95-104, [Retrieved from Internet on Jun. 19, 2017], <https://pdfs.semanticscholar.org/76b5/60b3b69bd73a082c8a4dcf850b3e2e84af14.pdf>.*

Huzefa Kagdi et al., "Mining Software Repositories for Traceability Links", [Online], IEEE-2007, pp. 1-10, [Retrieved from Internet on Jun. 19, 2017], <http://ieeexplore.ieee.org/stamp/stamp.jsp?arnumber=4268249>.*

Bart Van Rompaey et al., "Establishing Traceability Links between Unit Test Cases and Units under Test", [Online], IEEE-2009, pp. 209-218, [Retrieved from Interenet on Jun. 19, 2017], <http://ieeexplore.ieee.org/stamp/stamp.jsp?arnumber=4812754>.*

Barth'el'emy Dagenais et al., "Recovering Traceability Links between an API and Its Learning Resources", [Online], 2012, pp. 47-57, [Retrieved from Internet on Sep. 6, 2017], <http://ieeexplore.ieee.org/stamp/stamp.jsp?arnumber=6227207>.*

Craig Henderson, "Managing Software Defects: Defect analysis and traceability", [Online], 2008, pp. 1-3, [Retrieved from Internet on Dec. 11, 2017], <http://delivery.acm.org/10.1145/1390000/1384141/a2-henderson.pdf>.*

IBM Patents or Patent Applications Treated as Related, Appendix P, dated Sep. 25, 2015, pp. 1-2.

Gullion, Tom, "Unified Process using the Borland® ALM Solution," Borland Software Corporation, 100 Enterprise Way, Scotts Valley, CA, 95066-3249, Copyright © 2004 Borland® Software Corporation.

Mihindukulasooriya et al., "Linked Data Platform as a novel approach for Enterprise Application Integration", Center for Open Middleware, Ontology Engineering Group, Universidad Polit'ecnica de Madrid, Spain, pp. 1-11, COLD. 2013.

Roman et al., "Application Mobility in Active Spaces", 1st International Conference on Mobile and Ubiquitous Multimedia, Oulu, Finland, 2002.

Tewissen et al., ""MatchMaker": Synchronising Objects in Replicated Software-Architectures", Proceeding of the 6th International Workshop on Groupware CRIWG 2000, Maderia, Portugal, Oct. 18-20, 2000, IEEE CS Press.

"Maintaining the Integrity of Process Conventions Within an ALM Framework", U.S. Appl. No. 14/510,648, filed Oct. 9, 2014.

"Maintaining the Integrity of Process Conventions Within an ALM Framework", U.S. Appl. No. 14/723,985, filed May 28, 2105.

Akbulut et al., "Increasing Accuracy of Traceability Links and Structured Data", U.S. Appl. No. 14/669,050, filed Mar. 26, 2015, pp. 1-32.

Giuliano Antoniol et al., "Recovering Traceability Links between Code and Documentation", [Online], IEEE2002, pp. 970-983, [Retrieved from Internet on Jun. 15, 2017], <http://ieeexplore.ieee.org/stamp/stamp.jsp?arnumber=1041053>.

Andrian Marcus et al., "Recovering Documentation-to-Source-Code Traceability Links using Latent Semantic Indexing", [Online], IEEE2003, pp. 1-11, [Retrieved from Internet on Jun. 15, 2017], <http://ieeexplore.ieee.org/stamp/stamp.jsp?arnumber=1201194>.

G. Antoniol et al., "Information Retrieval Models for Recovering Traceability Links between Code and Documentation", [Online], IEEE 2000, pp. 40-49, [Retrieved from internet on Jun. 15, 2017], <http://ieeexplore.ieee.org/stamp/stamp.jsp?arnumber=883003>.

Jonathan I. Maletic et al., "Using a Hypertext Model for Traceability Link Conformance Analysis", [Online], 2003, pp. 1-8, [Retrieved from Internet on Jun. 15, 2017], <https://pdfs.semanticscholar.org/a13c/b7a5c14e60f505c35b03765db979dd86c6de.pdf>.

* cited by examiner

INCREASING ACCURACY OF TRACEABILITY LINKS AND STRUCTURED DATA

BACKGROUND OF THE INVENTION

The present invention relates generally to application lifecycle management (ALM) systems, and more particularly to increasing accuracy of links and structured data in ALM systems.

ALM frameworks provide product lifecycle management capabilities (e.g., governance, development, and maintenance) for software development and other collaborative endeavors. ALM frameworks provide services (e.g., cross-application linking) that enable different ALM applications to share information during development processes and help ensure that all users and user activities are synchronized.

SUMMARY

According to an embodiment of the present invention, a method is provided comprising: receiving, by one or more computer processors, an artifact; parsing, by one or more computer processors, unstructured content of the artifact; analyzing, by one or more computer processors, the parsed content to identify data for one or more of missing structured content of the artifact and inaccurate structured content of the artifact; and adding to the artifact, by one or more computer processors, the identified data for one or more of the missing structure content of the artifact and the inaccurate structured content of the artifact.

DETAILED DESCRIPTION

Embodiments of the present invention recognize that a significant problem for users of ALM frameworks is the accuracy of structured information that is used to run queries and create reports. Such queries and reports rely on structured data stored in attributes of artifacts and traceability links that semantically connect them. For example, in the context of a scrum (as defined in agile development methodology), a report that shows "ID, description, category, and story Points of Story and parent Epic artifacts for targetSprint 36" requires all parent-child links between Epics and Stories to be properly created, and the values of the target Sprint and story Point attributes to be correctly entered. However, development teams may not properly maintain structured lifecycle artifacts according to appropriate development process conventions, despite customization support that may be provided by ALM applications. As a result, many ALM repositories can contain incorrect or missing structured data, resulting in low quality reports with inaccurate information.

Embodiments of the present invention provide systems, methods, and computer program products for providing data for missing and inaccurate structured content in an ALM artifact, thereby improving the accuracy of structured information that may ultimately be used to run queries and create reports.

Figure 1:
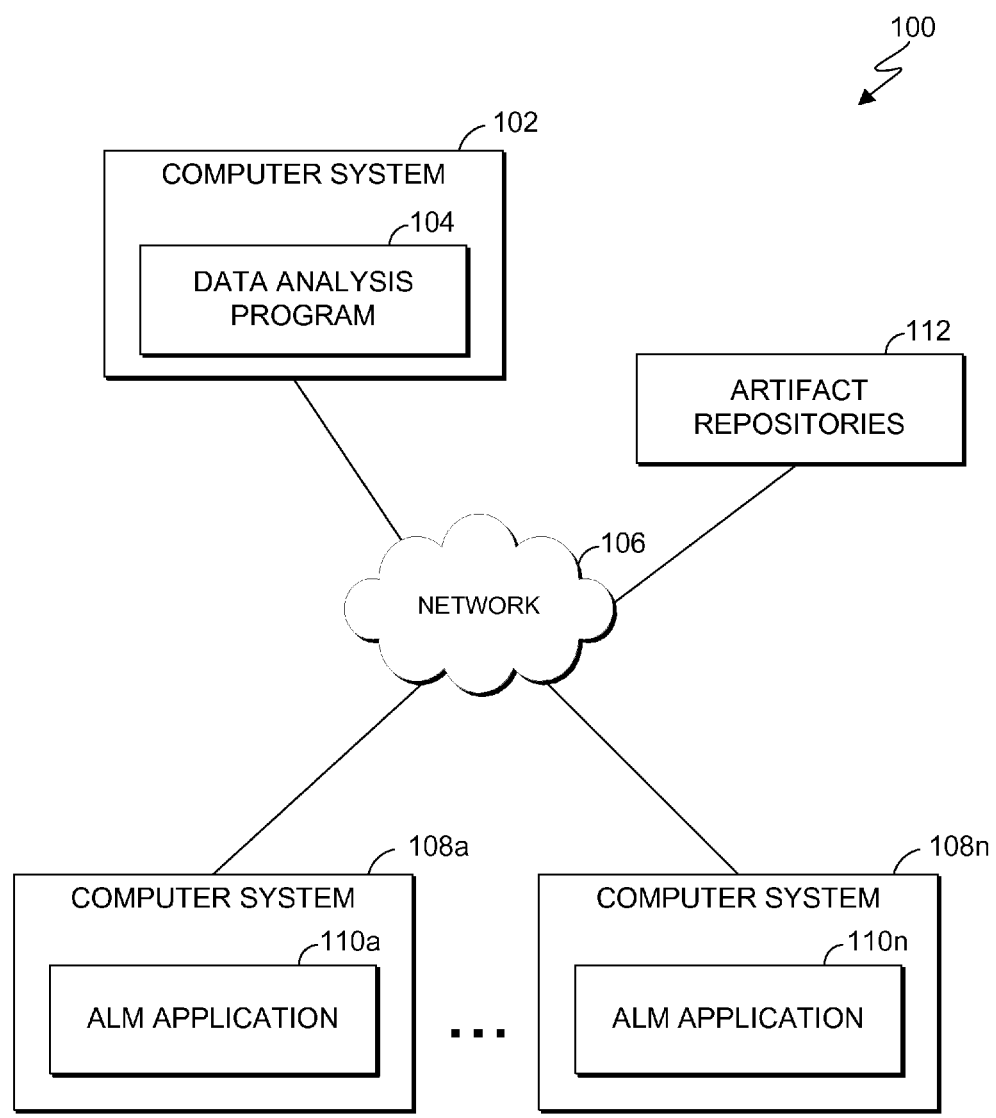
FIG. 1 is a block diagram of a computing environment, in accordance with an embodiment of the present invention.
Figure 7:
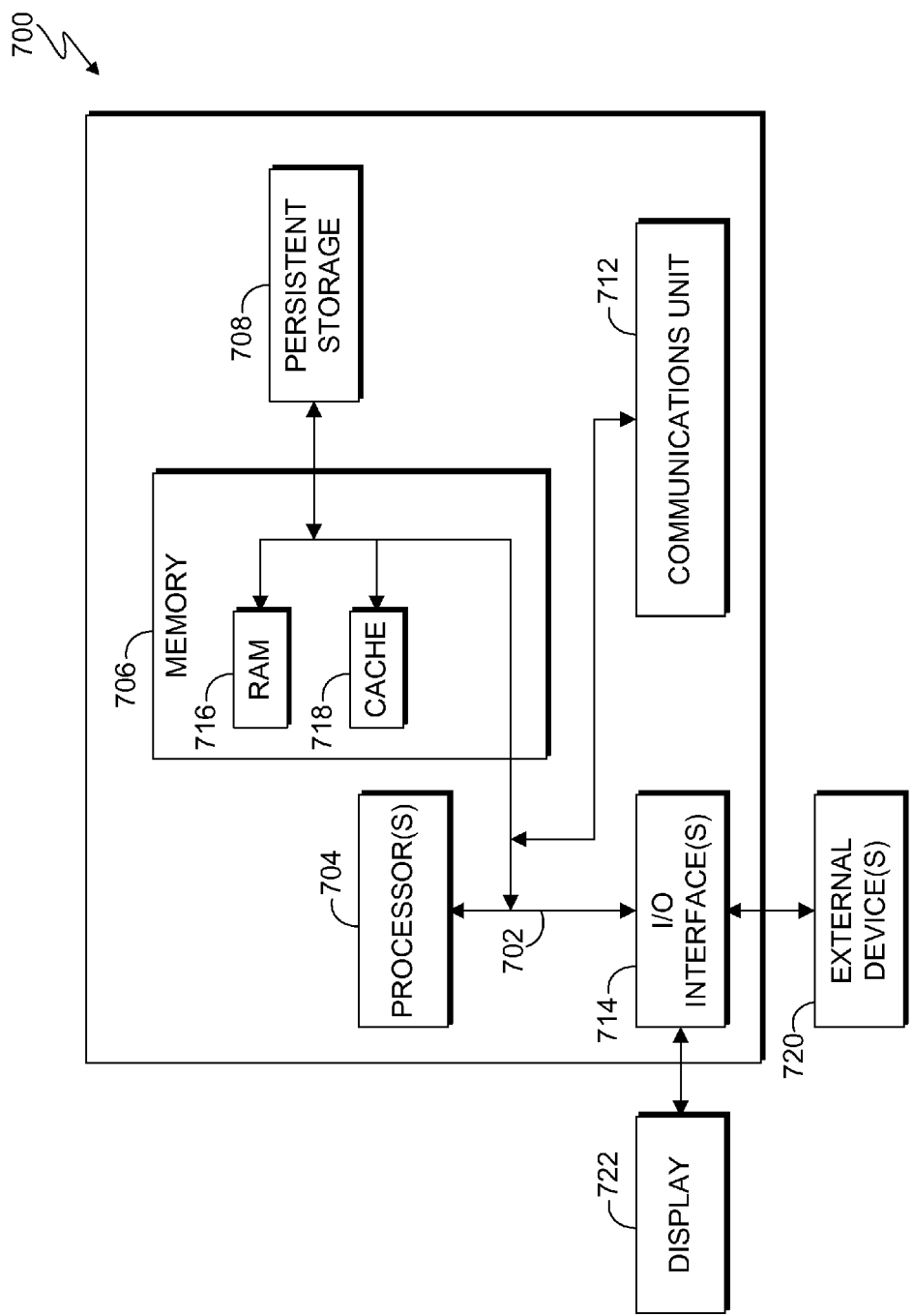
FIG. 7 is a block diagram of internal and external components of the computer system of FIG. 1, in accordance with an embodiment of the present invention.

FIG. 1 is a functional block diagram of computing environment 100, in accordance with an embodiment of the present invention. Computing environment 100 includes computer system 102, computer systems 108$a$-$n$, and artifact repositories 112, all interconnected over network 106. Computer system 102 and computer systems 108$a$-$n$ can be desktop computers, laptop computers, specialized computer servers, or any other computer systems known in the art. In certain embodiments, computer system 102 and computer systems 108$a$-$n$ represent computer systems utilizing clustered computers and components to act as a single pool of seamless resources when accessed through network 106. For example, such embodiments may be used in data center, cloud computing, storage area network (SAN), and network attached storage (NAS) applications. In certain embodiments, computer system 102 and computer systems 108$a$-$n$ represent virtual machines. In general, computer system 102 and computer systems 108$a$-$n$ are representative of any electronic devices, or combination of electronic devices, capable of executing machine-readable program instructions, as described in greater detail with regard to FIG. 7.

Computer system 102 includes data analysis program 104. Data analysis program 104 analyzes data of ALM artifacts stored in artifact repositories 112 to identify and provide data for missing and inaccurate structured content in ALM artifacts. The term "artifact", as used herein, refers generally to a resource including content that can be structured and/or unstructured. For example, in the context of application development, structured content of an artifact may include attributes and traceability links, while unstructured content may include a written description or narrative pertaining to the artifact. In this embodiment, data analysis program 104 utilizes known natural language processing (NLP) and machine learning technologies to analyze artifact data. In certain embodiments, data analysis program 104 can incorporate or otherwise utilize a larger pipeline of parsing and semantic analysis components used in known question answering systems.

Computer systems 108$a$-$n$ each include a respective ALM application 110$a$-$n$. Computer systems 108$a$-$n$ represent computer systems operating within an ALM framework that can create, access, and manipulate artifacts stored in artifact repositories 112. For example, computer systems 108$a$-$n$ can each be a computer system within an ALM framework for product lifecycle management of software development. ALM applications 110$a$-$n$ can each have different functions depending on their particular ALM domains, such as requirements management, programming, and testing maintenance. In this embodiment, computer systems 108a-n can also run queries on artifact repositories 112 and generate reports.

Artifact repositories 112 are used to store artifacts and other information of ALM applications 110a-n. In this embodiment, artifact repositories 112 can be queried by ALM applications 110a-n to generate reports. ALM applications 110a-n can use different repositories of artifact repositories 112 (e.g., different repositories for different ALM domains) or can share artifact repositories 112. In this embodiment, artifact repositories 112 are hosted off of computer systems 102 and 108a-n and are accessible through network 106. In other embodiments, one or more of artifact repositories 112 can be hosted locally on one or more of computer systems 102 and 108a-n. In general, artifact repositories can be implemented using any suitable storage media and storage architectures known in the art.

Figure 2:
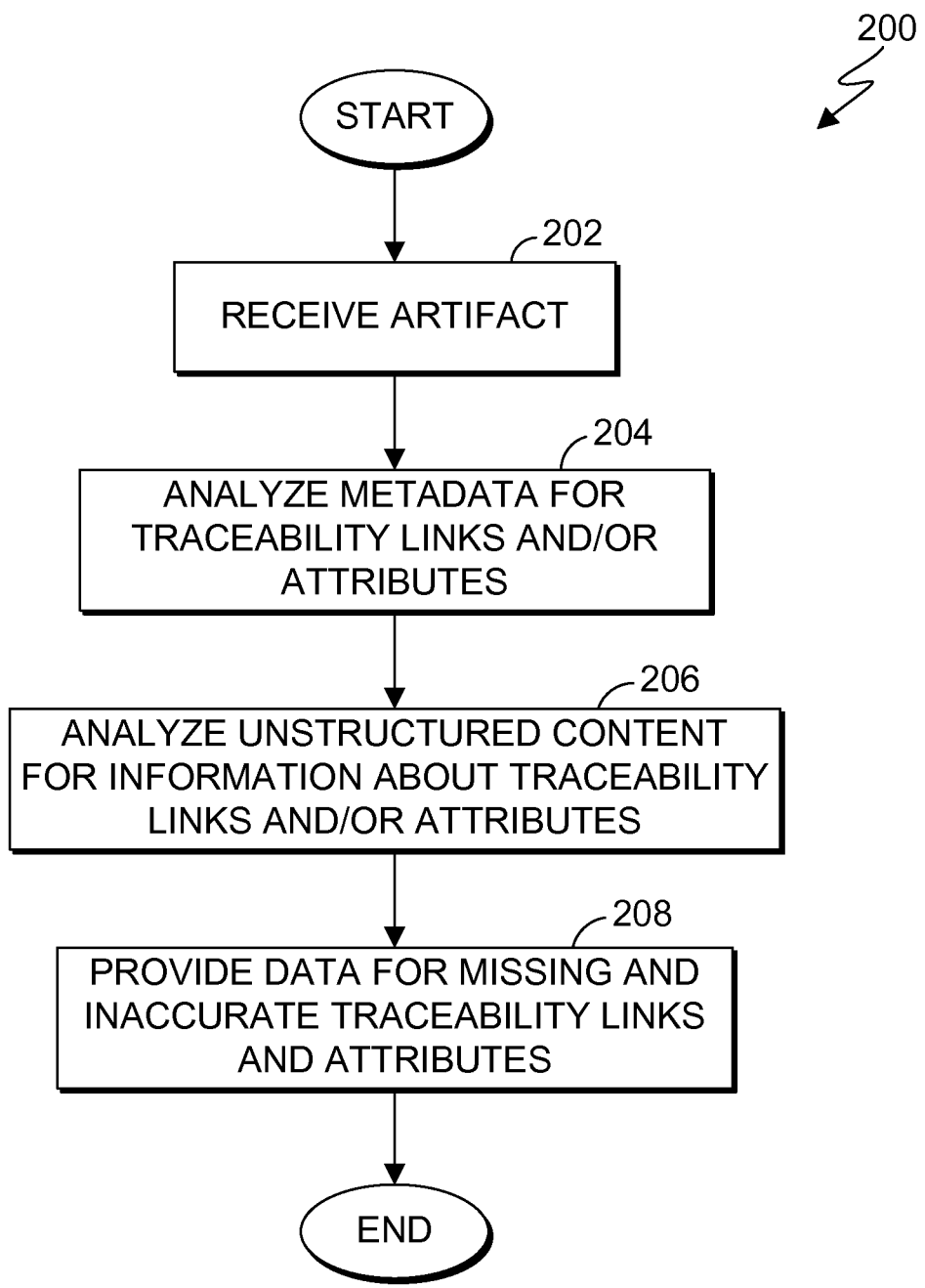
FIG. 2 is a flowchart illustrating operational steps for providing data for missing and inaccurate structured content in an ALM artifact, in accordance with an embodiment of the present invention.

FIG. 2 is a flowchart 200 illustrating operational steps for providing data for missing and inaccurate structured content in an ALM artifact, in accordance with an embodiment of the present invention.

In step 202, data analysis program 104 receives an ALM artifact stored on one or more of artifact repositories 112. In this embodiment, a user of computer system 102 selects the ALM artifact (e.g., through a user interface) and data analysis program 104 retrieves the selected ALM artifact via network 106. In other embodiments, data analysis program 104 can receive ALM artifacts in other manners. For example, data analysis program 104 can periodically scan through and select ALM artifacts stored in artifact repositories 112, or data analysis program 104 can receive ALM artifacts when those ALM artifacts are first created or are updated by a user or application, or when ALM artifacts are returned as results of a query.

In step 204, data analysis program 104 analyzes metadata of the ALM artifact for traceability links and attributes of the ALM artifact. In this embodiment, ALM artifacts can include one or more traceability links to represent relationships between different artifacts and attributes of those artifacts. For example, in the context of scrum, an ALM artifact for a Story may have a traceability link to an ALM artifact for an Epic indicating that the Story is a child of that Epic. The ALM artifact for the Story may also have a traceability link to one or more ALM artifacts for test cases indicating that the Story is tested by those test cases. In general, ALM artifacts can include any desired traceability links representing any desired relationships between ALM artifacts and/or specific attributes thereof.

ALM artifacts also include structured content. In this embodiment, structured content of ALM artifacts includes one or more attributes and values of those attributes. Attributes can further define what types of values (e.g., strings, integers, etc.) can be entered for particular attributes. For example, in the context of scrum, an ALM artifact for a Story may have attributes for a title, category, target sprint, and owner. ALM artifacts can have any desired number of attributes.

Data analysis program 104 analyzes metadata of the ALM artifact to identify traceability links and attributes of the ALM artifact that have missing or inaccurate data. In this embodiment, as discussed in greater detail with regard to FIG. 3, data analysis program 104 uses search, relation extraction, concept expansion, and machine learning techniques to identify candidate traceability links and attributes, along with confidence scores.

In step 206, data analysis program 104 analyzes unstructured content of the ALM artifact for information about traceability links and structured content of the ALM artifact. In this embodiment, ALM artifacts can also include unstructured content, such as text information pertaining to the ALM artifacts. For example, in the context of scrum, an ALM artifact for a Story may include unstructured content in the form of text drafted by a user that provides a description of the purpose of the ALM artifact along with comments pertaining to the current status of the ALM artifact or other related ALM artifacts.

Figure 4:
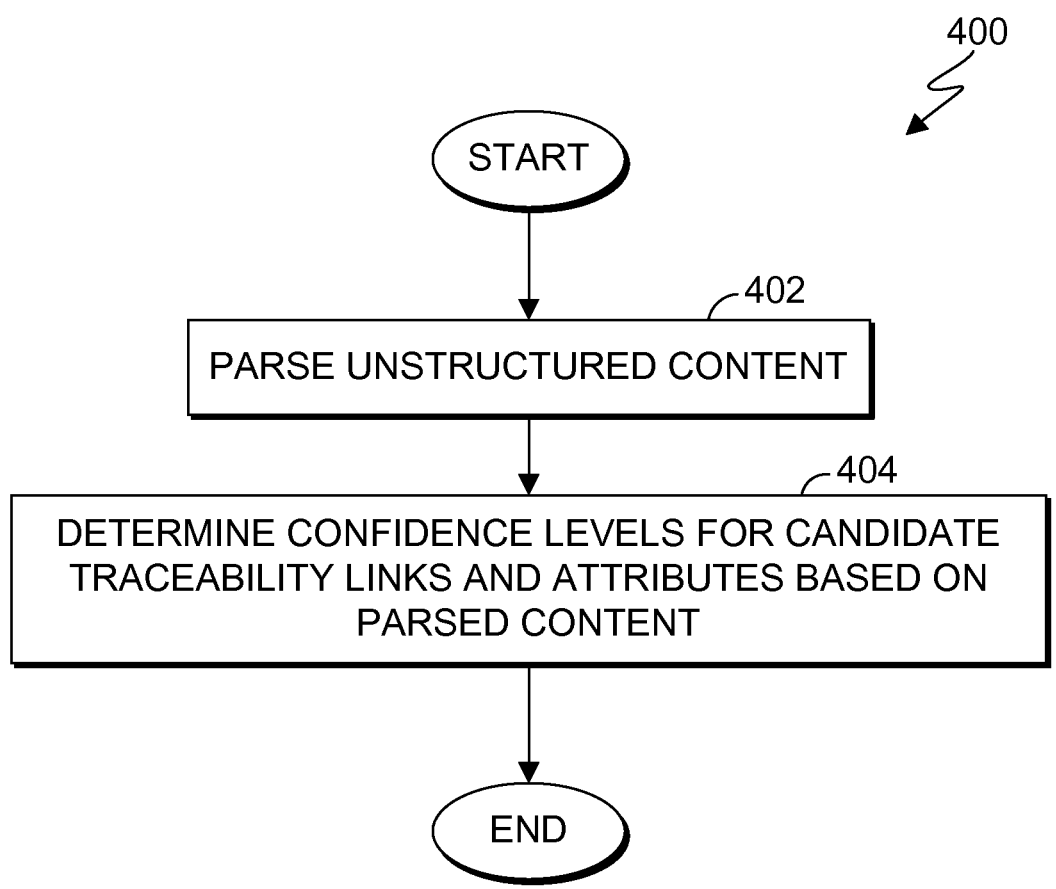
FIG. 4 is a flowchart illustrating operational steps for analyzing unstructured content of an ALM artifact to extract information about traceability links and attributes, in accordance with an embodiment of the present invention.

As discussed in greater detail with regard to FIG. 4, in this embodiment, data analysis program 104 uses one or more natural language processing (NLP) and machine learning techniques to identify candidate traceability links and attributes, along with confidence scores. Information pertaining to candidate traceability links and attributes that is obtained by analyzing unstructured content of the ALM artifact can be used alone and/or in conjunction with candidate traceability links and attributes obtained by analyzing metadata of the ALM artifact in step 204.

In step 208, data analysis program 104 provides data for missing and/or inaccurate traceability links and structured content of the ALM artifact. In this embodiment, data analysis program 104 analyzes the candidate traceability links and attributes identified in steps 204 and 206 and, based on those confidence scores, determines whether to automatically make an addition or correction to the ALM artifact, whether to suggest an addition or correction to the ALM artifact, and/or whether to ignore (i.e., not automatically apply or suggest) one or more of the candidate traceability links and attributes. In this embodiment, a user can define threshold confidence levels for performing these actions. For example, a first threshold (e.g., <30% confidence) can be defined, such that data analysis program 104 will ignore candidate traceability links and attributes having confidence scores less than or equal to the first threshold; a second threshold (e.g., <90% confidence) can be defined, such that data analysis program 104 will prompt the user to make an addition or correction for candidate traceability links and attributes having confidence scores greater than the first threshold and less than or equal to the second threshold; and a third threshold (e.g., >90%) can be defined, such that data analysis program 104 will automatically make an addition or correction based on candidate traceability links and attributes having confidence scores greater than the third threshold.

In another embodiment, data analysis program 104 can provide candidate traceability links and attributes as suggestions for modifying a query. For example, a user query may have returned a particular artifact, and data analysis program 104 may then identify candidate parent or child traceability links that can be added to the artifact and a candidate attribute for a particular category of artifact. In response, data analysis program 104 can suggest modifications to the original user query to capture results that may be desired by the user (e.g., artifacts that are related as parent or child artifacts, and artifacts of the same category as the returned artifact) but would otherwise be missed.

Accordingly, by performing the operational steps of FIG. 2, data analysis program 104 can identify and provide data for missing and inaccurate structured content in an ALM artifact. The operational steps of FIG. 2 can be repeated for each ALM artifact stored in artifact repositories 112, thereby improving the accuracy of structured information that may ultimately be used to run queries and create reports, and easing the burden on users of the ALM framework in properly documenting and maintaining traceability links and attributes of ALM artifacts.

Figure 3:
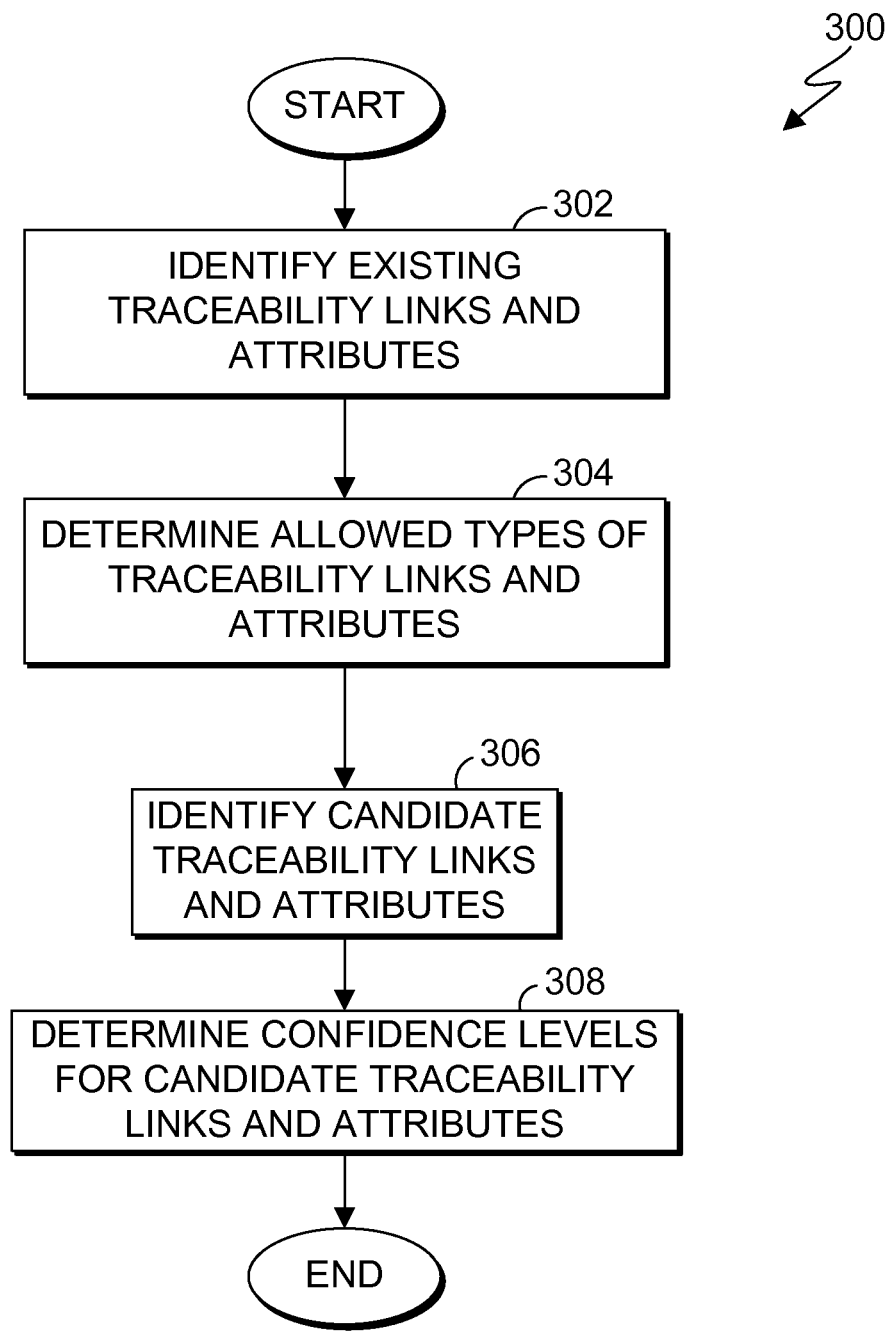
FIG. 3 is a flowchart illustrating operational steps for analyzing metadata of an ALM artifact for traceability links and attributes, in accordance with an embodiment of the present invention.

FIG. 3 is a flowchart 300 illustrating operational steps for analyzing metadata of an ALM artifact for traceability links and attributes, in accordance with an embodiment of the present invention. For example, the operational steps of FIG. 3 can be performed at step 204 of FIG. 2.

In step 302, data analysis program 104 identifies existing traceability links and attributes of the ALM artifact. In this embodiment, data analysis program 104 accesses metadata of the ALM artifact, which specifies any existing traceability links and attributes of the ALM artifact. Existing attributes of the ALM artifact can include attributes that have data values entered (whether accurate or inaccurate) as well as attributes that are included in the ALM artifact but do not have data values entered (e.g., an empty field or null value). In this embodiment, data analysis program 104 analyzes all existing traceability links and attributes found in the metadata of the ALM artifact. In other embodiments, data analysis program 104 can be configured to only analyze particular traceability links and/or attributes found in the metadata of the ALM artifact.

In step 304, data analysis program 104 determines allowed types of traceability links and attributes of the ALM artifact. In this embodiment, data analysis program 104 accesses metadata of the ALM artifact, which also specifies allowed types of traceability links and attributes (i.e., the types of traceability links and attributes that can be configured for the ALM artifact). For example, in the context of a scrum, a Story artifact may have an existing parent traceability link to an Epic artifact, with additional allowed types including child and testedBy traceability links, among others. Similarly, existing attributes may include title, owner, description, with additional allowed types including target sprint, test case, or any number of other attributes. For each such attribute, the metadata of the ALM artifact further specifies the permissible types of data values for each attribute, such as strings and integers.

The allowed types of traceability links and attributes of ALM artifacts can be configured as desired. For example, a user may configure allowed types of traceability links and attributes during creation of an ALM artifact, or one or more of ALM applications 110a-n may use policies that define particular types of traceability links and attributes that are allowed for particular types of ALM artifacts, which can vary depending on domain and purpose.

In step 306, data analysis program 104 identifies one or more candidate traceability links and attributes for the ALM artifact. In this embodiment, data analysis program 104 uses known search and relation extraction techniques and concept expansion techniques to identify candidate traceability links and/or attributes. A candidate traceability link is a traceability link that comports with the allowed types of traceability links and can be added to the ALM artifact, whether as an additional traceability link or to replace an existing traceability link. A candidate attribute is an attribute that comports with the allowed types of attributes and has a value that can be added to the ALM artifact as a new attribute or to replace a value of an existing attribute.

In this embodiment, data analysis program 104 can identify candidate attributes by accessing artifact repositories 112 to identify other ALM artifacts and values of attributes in those other ALM artifacts that comport with the allowed types of attributes identified in step 302. For example, after identifying that the allowed attributes for the ALM artifact include owner and test case attributes, data analysis program 104 may search other ALM artifacts in artifact repositories 112 to identify test case artifacts, as well as values of test case attributes and owner attributes of other ALM artifacts. Similarly, data analysis program 104 can identify candidate traceability links by accessing artifact repositories 112 to identify other ALM artifacts of a type that comport with allowed types of traceability links identified in step 302. For example, after identifying that the allowed traceability links for the ALM artifact include parent and testedBy traceability links, data analysis program 104 can search for other ALM artifacts that could possibly be related to the ALM artifact as a parent artifact (e.g., an Epic where the ALM artifact is a Story) or as a test-related artifact (e.g., a Test Case artifact describing testing of the Story). Data analysis program 104 can further employ concept expansion techniques to map concepts to terms and other related concepts. For example, data analysis program 104 may identify a test case artifact for displaying a navigable menu and employ concept expansion techniques to map that test case artifact to a broader concept of graphical user interfaces and test cases pertaining thereto.

In step 308, data analysis program 104 determines confidence levels for candidate traceability links and attributes identified in step 304. In this embodiment, data analysis program 104 uses one or more machine learning technologies to construct machine learning models that output confidence levels that reflect likelihood of accuracy of particular candidate attributes and traceability links with respect to the ALM artifact. For example, machine learning models for candidate traceability links can include as variables one or more existing attributes and values for the ALM artifact (e.g., attributes that can be used to reveal relationships between the ALM artifact and traceability links, such as title, category, owner, etc.), one or more existing traceability links, one or more candidate traceability links, and attributes and values for the ALM artifacts having the candidate traceability links. Such machine learning models can output, for example, a confidence level that reflects a likelihood of particular candidate traceability link being applicable to the ALM artifact, which can in turn dictate whether to add the candidate traceability link to the ALM artifact as a new traceability link. Such machine learning models can also be used to determine whether a particular existing traceability link is accurate, which can dictate whether to replace the existing traceability link in the ALM artifact with a candidate traceability link (e.g., a confidence level can be generated for the existing traceability link and for a candidate traceability link, where the existing traceability link is determined to be inaccurate if its confidence score is lower than that of the candidate traceability link).

Similarly, for example, machine learning models for candidate attributes can include as variables one or more existing attributes and values for the ALM artifact and one or more candidate attributes. Such a machine learning model can output, for example, a confidence level that reflects a likelihood of a particular candidate attribute being applicable to the ALM artifact, which can dictate whether to add that candidate attribute and value and/or replace an existing, inaccurate attribute and value, as previously discussed.

In this embodiment, confidence levels are expressed in numerical form, such as a percentage confidence or numerical score. It will be apparent to those of ordinary skill in the art that other known machine learning technologies and strategies can be used.

FIG. 4 is a flowchart 400 illustrating operational steps for analyzing unstructured content of an ALM artifact to extract information about traceability links and attributes, in accordance with an embodiment of the present invention. For example, the operational steps of FIG. 4 can be performed at step 206 of FIG. 2.

In step 402, data analysis program 104 parses unstructured content of the ALM artifact. For example, data analysis program 104 can parse a textual description of an artifact. Data analysis program 104 can also parse unstructured content of other ALM artifacts in artifact repositories 112. In this embodiment, data analysis program 104 parses text content into words and phrases using known NLP technologies. In other embodiments, other known parsing technologies can be used.

In step 404, data analysis program 104 determines confidence levels for candidate traceability links and attributes based on the parsed content. In this embodiment, data analysis program 104 uses one or more machine learning models. For example, data analysis program 104 can use machine learning models previously constructed for analyzing metadata of the ALM artifact for traceability links and attributes, as previously discussed with respect to FIG. 3, and include as additional variables the parsed words and phrases extracted from the parsed content of the ALM artifact and one or more other ALM artifacts. Data analysis program 104 can keep confidence levels based on the parsed content separate from confidence levels calculated from the traceability links and attributes of the ALM artifact, or combine these confidence levels. In another embodiment, additional machine learning models can be constructed. Similarly, additional known analysis techniques can be employed, such as concept expansion, as previously discussed.

Figure 5:
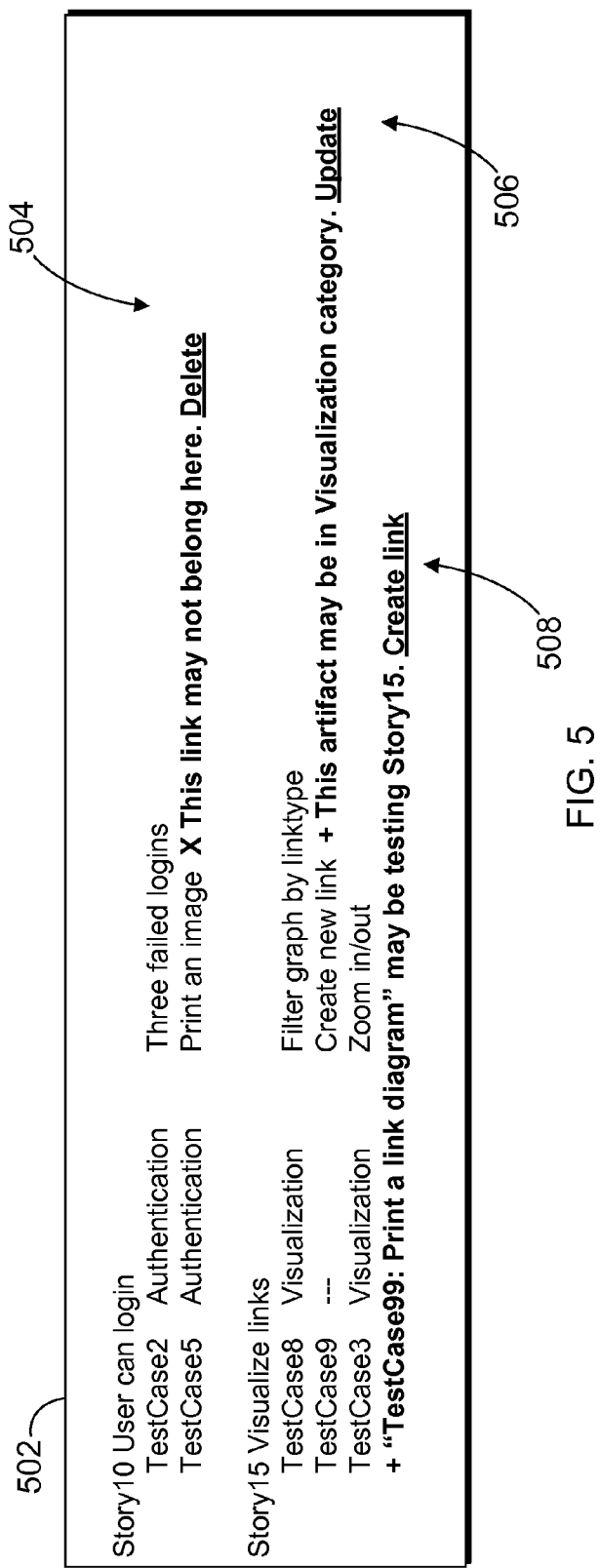
FIG. 5 depicts an example user interface in which a user can view and select suggested changes to traceability links and attributes of ALM artifacts, in accordance with an embodiment of the present invention.

FIG. 5 depicts an example user interface in which a user can view and select suggested changes to traceability links and attributes of ALM artifacts, in accordance with an embodiment of the present invention. In this example, a user has executed (e.g., using one of ALM applications 110a-n) a structured query (e.g., on artifact repositories 112) to generate a report of Story artifacts and Test Case artifacts in a particular Sprint, Sprint 26. For example, the query may take the form:

SELECT (Story.ID, Story.title, TestCase.functionalArea)
   (Story.testedBy.TestCsae.title, Story.testedBy.TestCase.weight)
WHERE Story.targetSprint=26

In another embodiment, a user issue queries by asking questions in natural language, which data analysis program 104 can analyze using NLP and machine learning models. For example, a user may type or verbally ask "What are the stories and test cases in sprint 26?". In another example, the user may ask "what are the failing tests of all Epics planned for sprint 36?", and data analysis program 104 can perform a search for epic artifacts having a target sprint attribute value of "sprint 36", and test case attributes containing "failed".

As shown in FIG. 5, the user is displayed window 502 containing results of the query. In this example, the results include a Story artifact "Story10" having a description attribute with a value of "User can login" and traceability links to Test Case artifacts "TestCase2" and "TestCase5". TestCase2 and TestCase5 each include a category attribute with the value "Authentication". TestCase2 includes a description attribute with a value of "Three failed logins", and TestCase5 has a description attribute with a value of "Print an image". In this example, data analysis program 104 has determined using NLP and machine learning models that the traceability link between Story10 and TestCase5 may not be appropriate, because TestCase5 pertains to printing of images, not logins, which are indicated by the description attributes of the Story10 and TestCase2 artifacts. Accordingly, data analysis program 104 provides the user with a message and option 504 to delete the traceability link between Story10 and TestCase5.

In this example, the results also include a Story artifact "Story15" having a description attribute with a value of "Visualize links" and traceability links to Test Case artifacts "TestCase8", "TestCase9", and "TestCase3". TestCase8 includes a category attribute with the value "Visualization" and a description attribute with the value "Filter graph by linktype". TestCase9 includes a category attribute that has been left empty and a description attribute with the value "Create new link". TestCase3 includes a category attribute with the value "Visualization" and a description attribute with the value "Zoom in/out".

As shown, data analysis program 104 has determined, using NLP and machine learning models, that TestCase9 may be in the Visualization category, because TestCase8 and TestCase3, which are also linked to Story15, are in the Visualization category and the value "Create new link" of the description attribute does not indicate an alternative category. Accordingly, data analysis program 104 provides the user with a message and option 506 to update the value of the category attribute for TestCase9 to be "Visualization".

In this example, data analysis program 104 has also determined using NLP and machine learning models that an additional Test Case artifact "TestCase99" may be testing Story15, and data analysis program 104 provides the user with a message and option 508 to create a traceability link of type testedBy between Story15 and TestCase99.

Figure 6:
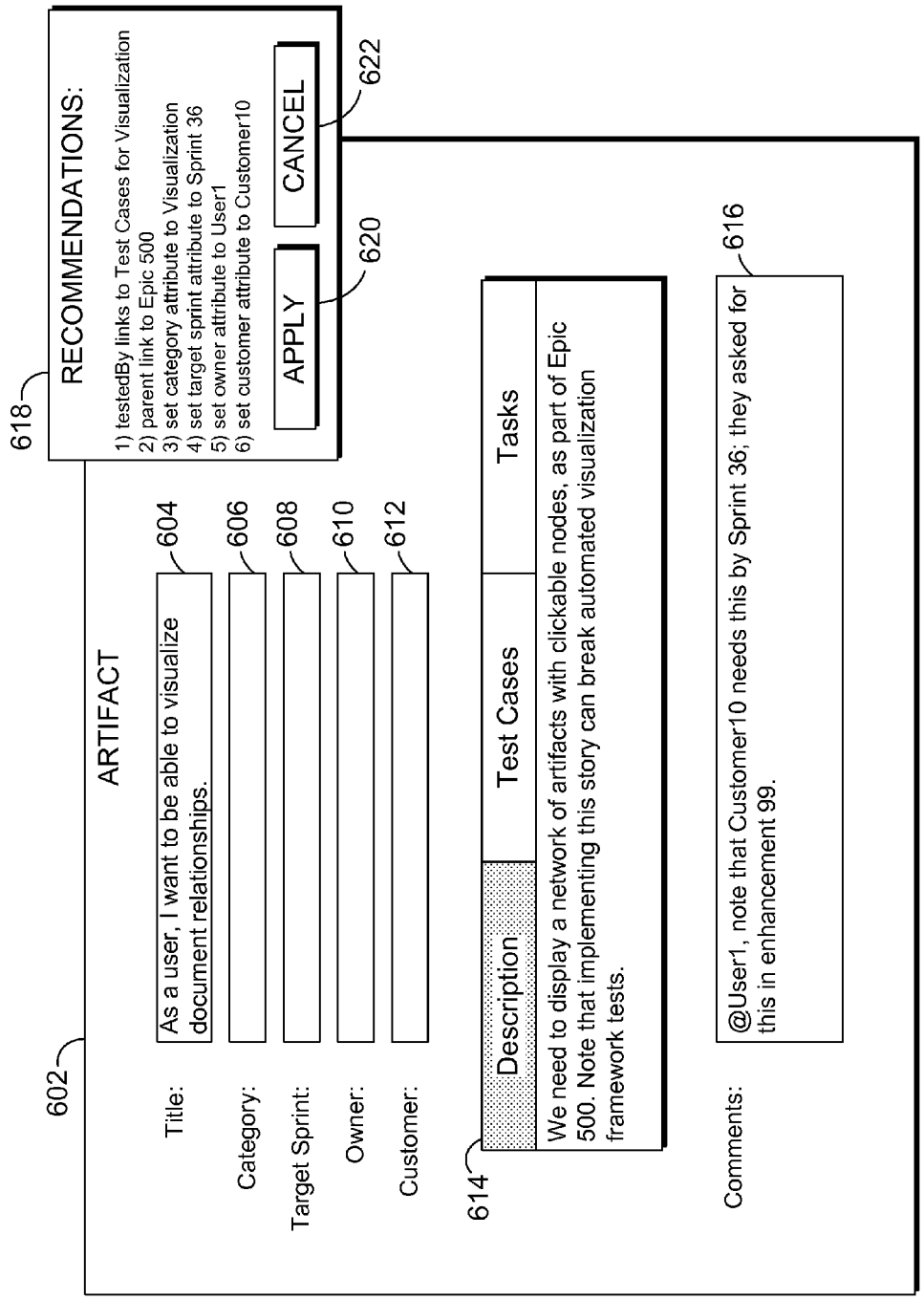
FIG. 6 depicts an example user interface in which a user can view and select suggested changes to traceability links and attributes of an ALM artifact, in accordance with another embodiment of the present invention.

FIG. 6 depicts an example user interface in which a user can view and select suggested changes to traceability links and attributes of an ALM artifact, in accordance with another embodiment of the present invention. In this example, window 602 is displayed for a user (e.g., by one of ALM applications 110a-n). Window 602 displays information of an ALM artifact (e.g., a Story artifact), including values for various attributes. As shown, title attribute 604 includes a value of "As a user, I want to be able to visualize document relationships", while category attribute 606, target sprint attribute 608, owner attribute 610, and customer attribute 612 have been left blank. Window 602 also displays description attribute 614, the value of which includes strings containing a textual description of the purpose of the particular story artifact, along with a note pertaining to tests affected by implementation of the story. In this example, the user can select the tabs for "Test Cases" or "Tasks" to display any test cases and tasks linked to the story artifact, respectively. Window 602 also displays comments attribute 616, the value of which includes strings containing comments pertaining to the story artifact.

Recommendations window 618 is displayed for the user and contains multiple recommendations for changes to be made to the attributes and/or traceability links. In this example, data analysis program 104 has provided six recommendations by analyzing structured and unstructured content of the ALM artifact using NLP and one or more machine learning models, including: a recommendation to add traceability links of type "testedBy" be added to link the ALM artifact with Test Case artifacts having a category attribute with the value "Visualization" (e.g., based on references to visualization tests in description attribute 614); a recommendation to add a traceability link of type "parent" between the story artifact and the Epic 500 parent artifact (e.g., based on references to Epic 500 in description attribute 614); a recommendation to set the value of category attribute 606 to "Visualization" (e.g., based on references to displaying a network of artifacts and visualization framework tests in description attribute 614); a recommendation to set the value of target sprint attribute 608 to "Sprint 36" (e.g., based on references to needing the story finished by Sprint 36 in comments attribute 616); a recommendation to set the value of owner attribute 610 to "User1" (e.g., based on the reference to User1 in comments attribute 616); and a recommendation to set the value of customer attribute 612 to "Customer10" (e.g., based on reference to Customer10 in comments attribute 616).

In this example, recommendations window 618 includes apply button 620 and cancel button 622. The user can select apply button 620 to make all of the recommended changes to the story artifact, or the user can select cancel button 622 to close recommendations window 618 and not apply the recommended changes to the story artifact. In other embodiments, the user may have other options (e.g., applying selected recommendations) and/or data analysis program 104 can automatically apply one or more recommended changes based on various criteria (e.g., confidence levels), as previously discussed.

Computer system 700 includes communications fabric 702, which provides for communications between one or more processors 704, memory 706, persistent storage 708, communications unit 712, and one or more input/output (I/O) interfaces 714. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 716 and cache memory 718. In general, memory 706 can include any suitable volatile or non-volatile computer-readable storage media. Software is stored in persistent storage 708 for execution and/or access by one or more of the respective processors 704 via one or more memories of memory 706.

Persistent storage 708 may include, for example, a plurality of magnetic hard disk drives. Alternatively, or in addition to magnetic hard disk drives, persistent storage 708 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 708 can also be removable. For example, a removable hard drive can be used for persistent storage 708. Other examples include optical and magnetic disks, thumb drives, and smart cards that are inserted into a drive for transfer onto another computer-readable storage medium that is also part of persistent storage 708.

Communications unit 712 provides for communications with other computer systems or devices via a network. In this exemplary embodiment, communications unit 712 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to computer system 700 through communications unit 712 (e.g., via the Internet, a local area network or other wide area network). From communications unit 712, the software and data can be loaded onto persistent storage 708.

One or more I/O interfaces 714 allow for input and output of data with other devices that may be connected to computer system 700. For example, I/O interface 714 can provide a connection to one or more external devices 720 such as a keyboard, computer mouse, touch screen, virtual keyboard, touch pad, pointing device, or other human interface devices. External devices 720 can also include portable computer-readable storage media such as, for example, thumb drives, portable optical or magnetic disks, and memory cards. I/O interface 714 also connects to display 722.

Display 722 provides a mechanism to display data to a user and can be, for example, a computer monitor. Display 722 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    receiving, by one or more computer processors, an artifact;
    parsing, by one or more computer processors, unstructured content of the artifact;
    analyzing, by one or more computer processors, the parsed content to identify one or more candidate traceability links and attributes for the artifact that comport with allowed types of traceability links and attributes for the artifact;
    determining, by one or more computer processors, a confidence level for each of the one or more candidate traceability links and attributes;
    suggesting, by one or more computer processors, to a user a modification to one or more existing traceability links and attributes of the artifact based on a first one or more candidate traceability links and attributes having a confidence level that satisfies a first threshold; and
    responsive to receiving a user selection, modifying the one or more existing traceability links and attributes of the artifact to include data from the first one or more candidate traceability links and attributes.

2. The method of claim 1, wherein the artifact is an artifact within an application lifecycle management framework.

3. The method of claim 1, wherein the unstructured content of the artifact comprises text strings and is parsed using natural language parsing.

4. The method of claim 1, wherein the parsed content is analyzed using one or more machine learning models.

5. The method of claim 1, further comprising:
    suggesting to a user, by one or more computer processors, an addition of one or more candidate traceability links and attributes having a confidence level that satisfies a second threshold; and
    responsive to receiving a user selection of one or more suggested candidate traceability links and attributes, adding to the artifact, by one or more computer processors, the selected one or more suggested candidate traceability links and attributes.

6. The method of claim 5, further comprising:
responsive to determining that one or more candidate traceability links and attributes have a confidence level that satisfies a third threshold, adding to the artifact, by one or more computer processors, the one or more candidate traceability links and attributes having a confidence level that satisfies the third threshold.

7. The method of claim 1, further comprising:
responsive to determining that one or more candidate traceability links and attributes have a confidence level that satisfies a second threshold, modifying the artifact, by one or more computer processors, to include data from the one or more candidate traceability links and attributes having a confidence level that satisfies the second threshold to the artifact.

* * * * *